(12) United States Patent
Evans et al.

(10) Patent No.: US 6,425,092 B1
(45) Date of Patent: Jul. 23, 2002

(54) METHOD AND APPARATUS FOR PREVENTING THERMAL FAILURE IN A SEMICONDUCTOR DEVICE THROUGH REDUNDANCY

(75) Inventors: Richard J. Evans, Underhill; Scott W. Gould, South Burlington; Anthony M. Palagonia, Underhill; Sebastian T. Ventrone, South Burlington, all of VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/098,571

(22) Filed: Jun. 17, 1998

(51) Int. Cl.[7] .............................................. G06F 11/00
(52) U.S. Cl. ........................................... 714/13; 714/7
(58) Field of Search .............................. 714/13, 3, 6–8, 714/11, 25, 30, 39, 43, 726, 727, 47

(56) References Cited

U.S. PATENT DOCUMENTS

| | | | |
|---|---|---|---|
| 4,346,459 A | * | 8/1982 | Sud et al. .................... 365/200 |
| 4,358,823 A | | 11/1982 | McDonald et al. |
| 4,521,871 A | | 6/1985 | Galdun et al. |
| 4,532,594 A | | 7/1985 | Hosaka et al. |
| 4,610,013 A | | 9/1986 | Long et al. |
| 4,819,232 A | | 4/1989 | Krings |
| 5,189,316 A | * | 2/1993 | Murakami et al. ........... 327/530 |
| 5,203,003 A | | 4/1993 | Donner |
| 5,206,778 A | | 4/1993 | Flynn et al. |
| 5,423,037 A | | 6/1995 | Hvasshovd |
| 5,451,892 A | | 9/1995 | Bailey |
| 5,511,161 A | | 4/1996 | Sato et al. |
| 5,544,077 A | | 8/1996 | Hershey |
| 5,555,404 A | | 9/1996 | Torbjornsen et al. |
| 5,590,061 A | | 12/1996 | Hollowell, II et al. |
| 5,627,962 A | | 5/1997 | Goodrum et al. |
| 5,644,700 A | | 7/1997 | Dickson et al. |
| 6,144,251 A | * | 11/2000 | Ogawa ......................... 327/544 |
| 6,208,170 B1 | * | 3/2001 | Iwaki et al. .................. 326/121 |
| 6,229,343 B1 | * | 5/2001 | Bauer et al. .................. 326/104 |
| 6,256,744 B1 | * | 7/2001 | Simonich et al. ............. 713/340 |

FOREIGN PATENT DOCUMENTS

| | | | |
|---|---|---|---|
| JP | 59-9729 | 1/1984 | ............. G06F/1/00 |
| JP | 4-317365 | 11/1992 | ........... H01L/23/58 |

* cited by examiner

Primary Examiner—Nadeem Iqbal
(74) Attorney, Agent, or Firm—Robert A. Walsh (57) ABSTRACT

Redundant chip sections held in standby are substituted for chip sections that are at risk of over heating based on certain sensor signals. When these signals are received operations of the chip section at risk IS transferred to a redundant chip section and the chip section at risk is shut down. After the original chip section has cooled, it becomes available as a replacement chip section itself. The sensor signals may be based on temperature values, elapsed operation time, and number or rate of operations within a chip section.

25 Claims, 12 Drawing Sheets

METHOD AND APPARATUS FOR PREVENTING THERMAL FAILURE IN A SEMICONDUCTOR DEVICE THROUGH REDUNDANCY

FIELD OF THE INVENTION

The present invention relates to the field of thermal management of semiconductor devices; more specifically, it relates to a technique of reusable redundant circuitry to prevent overheating of semiconductor devices.

BACKGROUND OF THE INVENTION

Semiconductor devices, especially microprocessor and other fast logic circuits, dissipate large amounts of heat during operation. Thermal management of such devices has been traditionally managed using heat sinks or other related thermal transfer solutions. A different class of solutions attacks the problem from within the chip itself.

Turning to the prior art, U.S. Pat. No 5,206,778 to Flynn et. al., teaches an on chip temperature sensing circuit that may be used by a thermal management system that may shut down some chip circuits. This patent is hereby incorporated by reference.

U.S. Pat. No. 5,451,892 to Baily, describes a thermal sensor circuit that controls the frequency of the CPU clock in a microprocessor in response to an increase in temperature above a first limit, and return to normal frequency in response to a decrease below a second limit. Though the chip is kept from overheating, for significant periods of time the chip is operating at lower speeds which would be a disadvantage in many situations.

Following along the same lines, U.S. Pat. No. 5,590,061 to Hollowell et. al. teaches turning off a portion of the chip in response to an increase in temperature above a first point and turning it back on in response to a decrease in temperature. Though the chip is kept from overheating, for significant periods of time portions of the chip are not operating which would be a disadvantage in many situations.

The present invention provides an on chip thermal management system that does not have significant impacts to the performance of the chip.

SUMMARY OF THE INVENTION

The present invention includes redundant chip sections held in standby that may be substituted for chip sections that are at risk of over heating based on certain sensor signals. When these signals are received operations of the chip section at risk transferred to a redundant chip section and the chip section at risk is shut down. After the original chip section has cooled, it becomes available as a replacement chip section itself. Therefore it is an object of the present invention to provide a semiconductor device with reusable redundant chip sections switchable among themselves.

Three methods of controlling the heat using different sensor signals are taught. According to the first method temperature sensing is used to activate and deactivate chip sections on as needed basis. In the second method a simple interval timer is used to sequentially activate and deactivate the various chip sections and in the third method, a transaction counter is used to count the number or rate of transactions within a section and to activate and deactivate chip sections on a as needed need basis. Accordingly, it is another object of the present invention to provide switching of chip sections to be based on temperature sensing, interval timing or transaction counting.

It is a still further object of the invention to provide a multi-chip application which includes identical redundant chips held in standby that may be substituted for chips that are at risk of over heating based on temperature sensing, interval timing, or transaction counting.

BRIEF DESCRIPTION OF DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
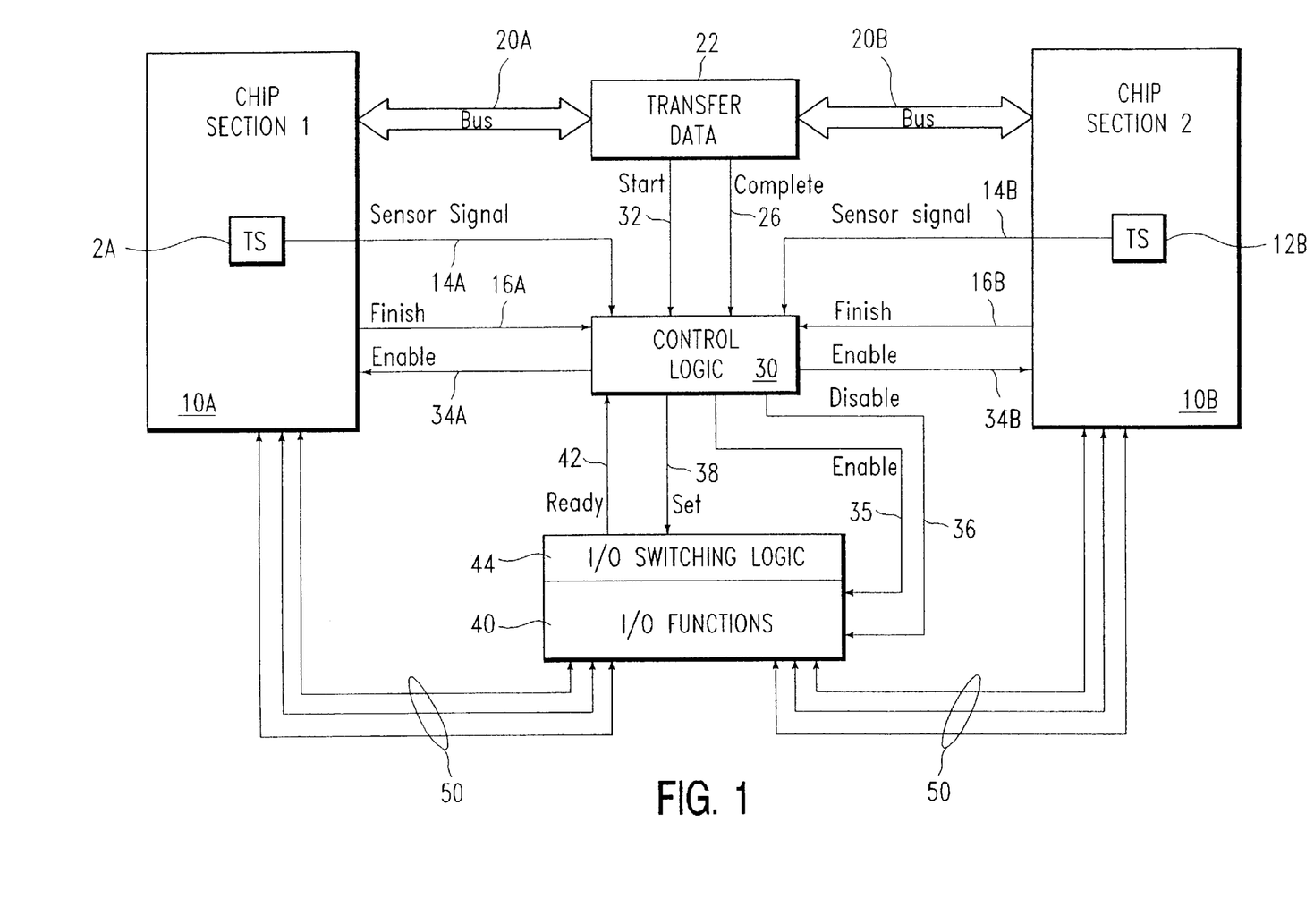
FIG. 1 is a block diagram according to the present invention using two chip sections and a temperature sensor to determine when switching should occur between the chip sections.
Figure 2:
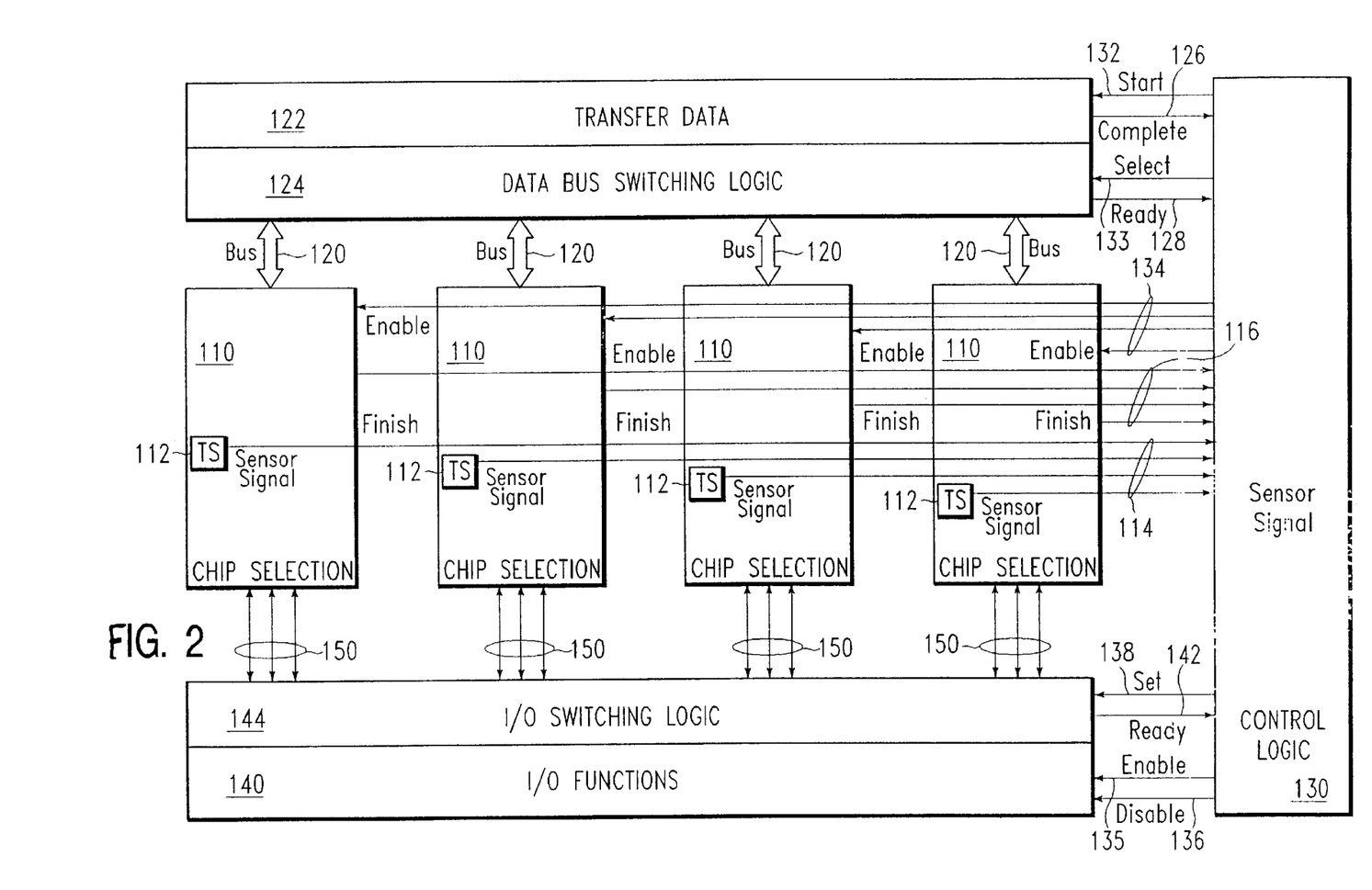
FIG. 2 is a block diagram of the present invention using multiple chip sections and temperature sensors to determine switching among the chip sections.

A technique to prevent thermal failures in semiconductor devices using temperature sensors in accordance with the present invention is illustrated in FIGS. 1 and 2. FIG. 1 shows a schematic using two identical chip sections 10A and 10B having circuits that perform the identical function that may be subject to thermal failure due to heavy duty cycles such as microprocessor chips. However when the present invention is utilized only one of the sections is active and being utilized while the other is inactive and in a standby mode ready to replace the active section at any given time. If chip section 10A is active and temperature sensor 12A senses a preset temperature level, a sensor signal 14A is sent to control logic circuit 30. In response to the sensor signal 14A the control logic circuit 30 turns off enable signal 34A which will stop any new operations to occur in chin section 10A. When chip section 10A has conpleted all current operations, a finish signal 16A is sent to the control logic circuit 30. Control logic circuit 30 also sends a start signal 32 to data transfer circuit 22 allowing transferring of data through buses 20A and 20B to chip section 10B. Such data transfer can occur either after chip section 10A shuts down or during normal operations as described below. Control logic circuit 30 also sends a set signal 38 to I/O switching logic circuits 44 which will stop the I/O signals 50 from chip 10A from being received by 110 function circuit 40 and allowing I/O signals 50 from chip 10B to be received by I/O function circuits 40. Then a ready signal 42 is sent back from I/O switching logic circuits 44 to the control logic circuit 30. Control logic circuit 30 also sends disable signal 36 to prevent pass thru of I/O signal 50 thru I/O function circuit 40. When the data transfer is finished, a complete signal 26 is returned to control logic circuit 30, enable signal 35 is sent to I/O function circuit 40, and enable signal 34B is turned on to chip section 10B at which point all operations that had been performed by chip section 10A are now performed by chip section 10B and chip section 10A is allowed to cool. Later, when temperature sensor 12B reaches a preset temperature level, sensor signal 14B is sent to control logic circuit 30 and the switching process described above is reversed. Thus original chip section 10A will then be reused as will chip section 10B at some future time when chip section 10A again reaches the preset temperature.

In some cases the time to overheat may exceed the time necessary to cool down the chip section so multiple chip sections would be required. In which case, a first section may be running, a second section may be cooling and a third section is in standby mode to replace the first section. It is also possible for the cool down time to be much shorter than the heat up time, but multiple chip sections may be desirable for performance reasons, and may share portions of a single or multiple replacement chip sections. Basic operation would be similar, but more complex control functions would be required.

FIG. 2 is a schematic illustrating multiple identical chip sections 110 having circuits that perform the identical functions that may be subject to thermal failure and a least one of the sections that is not in use would be in a standby mode ready to take over operations from the active chip section. The number of chip sections required is based on a calculation or model made of the chip section circuits under design or field operating conditions. Temperature sensors 112 monitor the temperature of each of the sections and temperature level sensor signal 114 is sent to control logic circuits 130 in the event any one of the section's temperature exceeds a preset limit. In response to the sensor signal 114 control logic circuit 130 turns off the enable signal 134 to the active chip section. When that chip section has completed current operations a finish signal 116 is sent to the control logic circuit 130 which sends a start signal 132 to the data transfer circuit 122 allowing the transfer of data through buses 120 to the chip section which is in the standby mode. This data transfer may occur after the active chip section shuts down or can be done continuously as described below. Control logic circuit 130 also sends a set signal 138 to I/O switching logic circuits 144 which stop I/O signals 150 from the active chip section being received by I/O function circuit 140 and allowing I/O signals 150 from chip the standby chip section to be received by I/O function circuits 140. Ready signal 142 is received back from I/O switching logic circuit 144. Control logic 130 also sends disable signal 136 to prevent pass thru of I/O signal 150 from the active chip section thru I/O function circuits 140. When data transfer is accomplished a complete signal 126 is returned to control logic circuit 130, and an enable signal 135 is sent to I/O function circuits 140, and an enable signal 134 is turned onto the appropriate standby chip section 110. All operations that had been performed by the active chip section are now performed by the standby section and the active chip section is allowed to cool. After cooling the active chip section itself is available for use as a replacement for any of the other chip sections and is placed in a standby mode.

Figure 3:
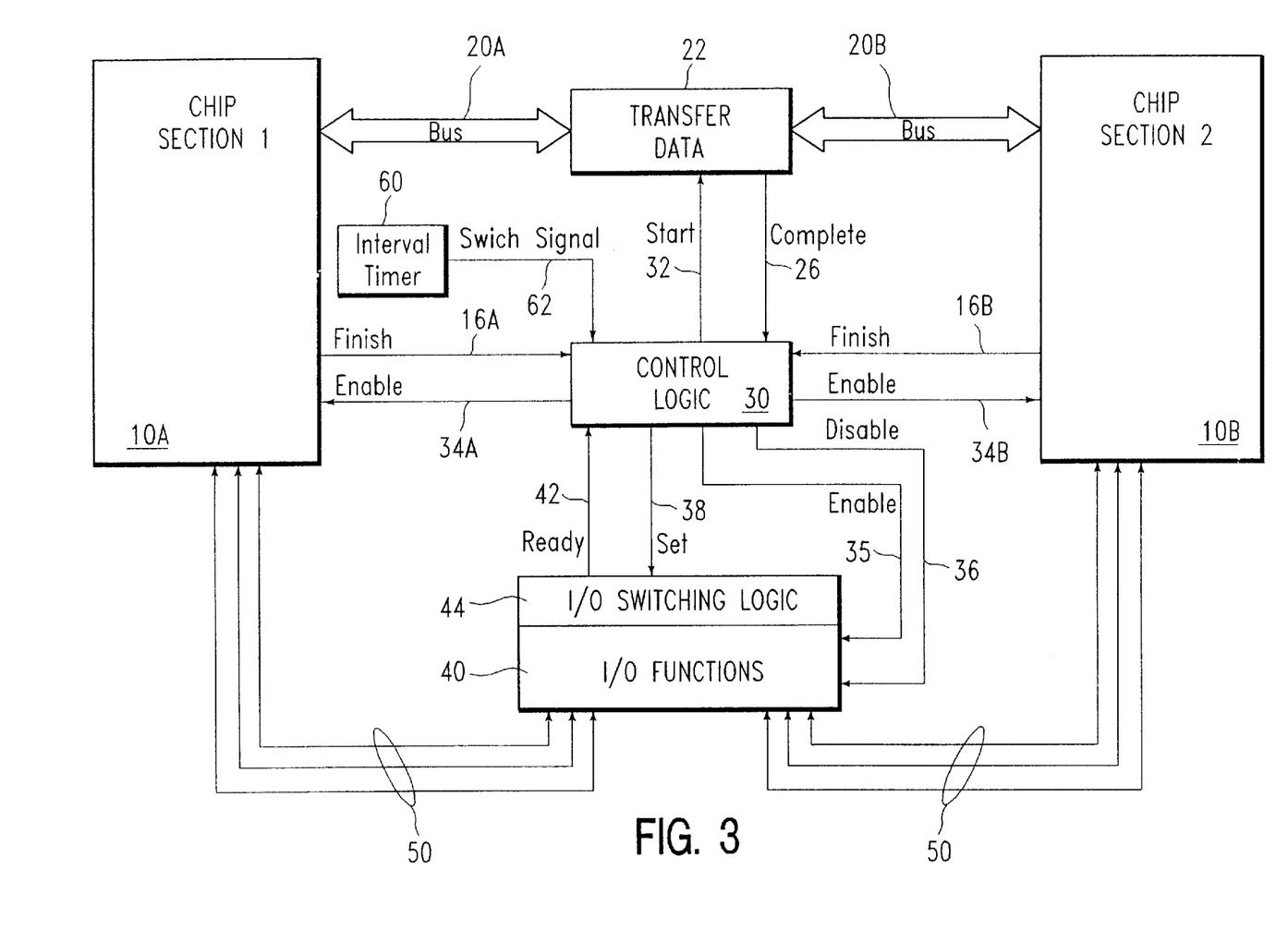
FIG. 3 is a block diagram of the invention using two chip sections and an interval timer to determine when switching should occur between the chip sections.
Figure 4:
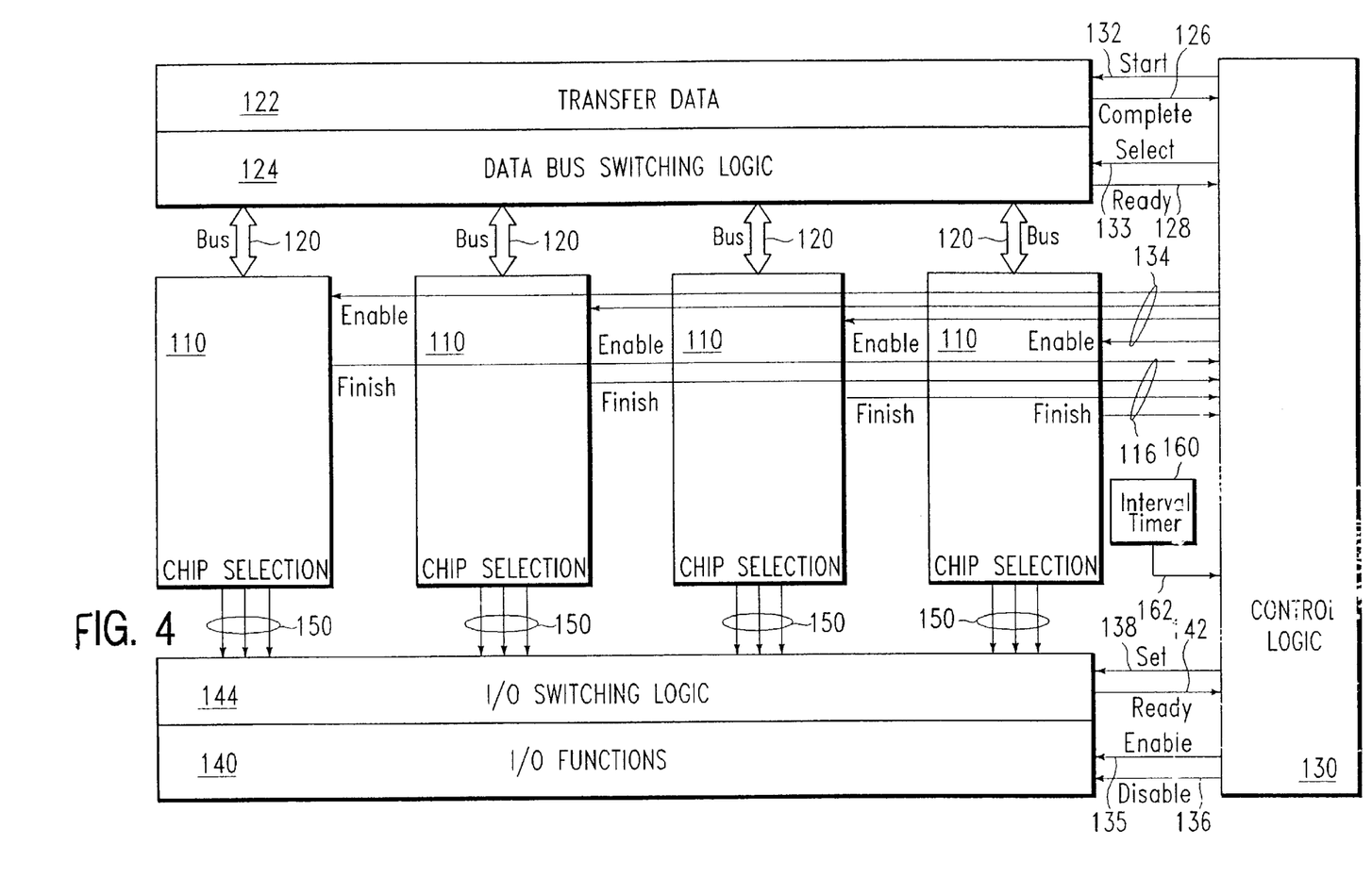
FIG. 4 is a block diagram of the invention using multiple chip sections and an interval timer to determine switching among the chip sections.

In another embodiment of the present invention, interval timing is used to initiate the switching from an active chip section to a standby chip section which is illustrated in FIGS. 3 and 4. The schematic diagram shown in FIG. 3 is similar to that shown in FIG. 1 where like numerals are used to identify like elements. However, it is noted that temperature sensors 12A and 12B have been replaced by an interval timer 60 which sends switch signal 62 to control logic 30 after a preset time has elapsed. This time is based on a calculation or an empirical model of the chip sections 10A and 10B circuits under design or experimental operating conditions such that an active chip section is shut down when it is anticipated to be running at an elevated temperature and replaced by a standby chip section.

Likewise the schematic diagram of the system shown in FIG. 4 is similar to the one shown in FIG. 2. Again the temperature sensors 112 have been replaced with interval timer 160 which sends switch signal 162 to control logic 130 after a preset time has elapsed. Both the number of chip sections time or rate is based on a calculation or empirical model made of the-chip section circuits under design or experimental operating conditions. The switching would be sequential, based on the longest running section to be replaced. Reset or initialization would require initial offsets in counters for each section in the control logic.

Figure 5:
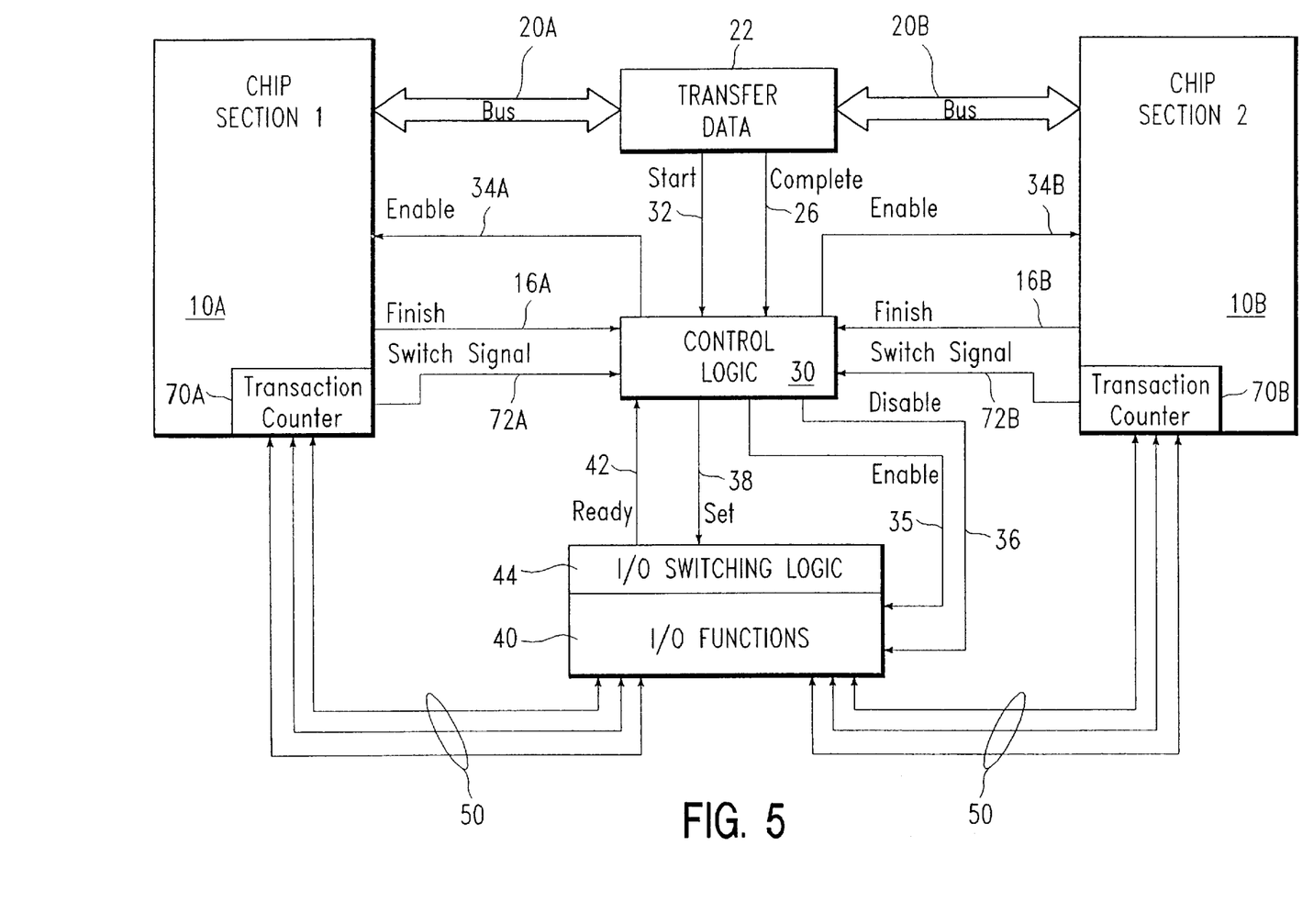
FIG. 5 is a block diagram of the invention using two chip sections with a transaction counter to determine switching between chip sections.
Figure 6:
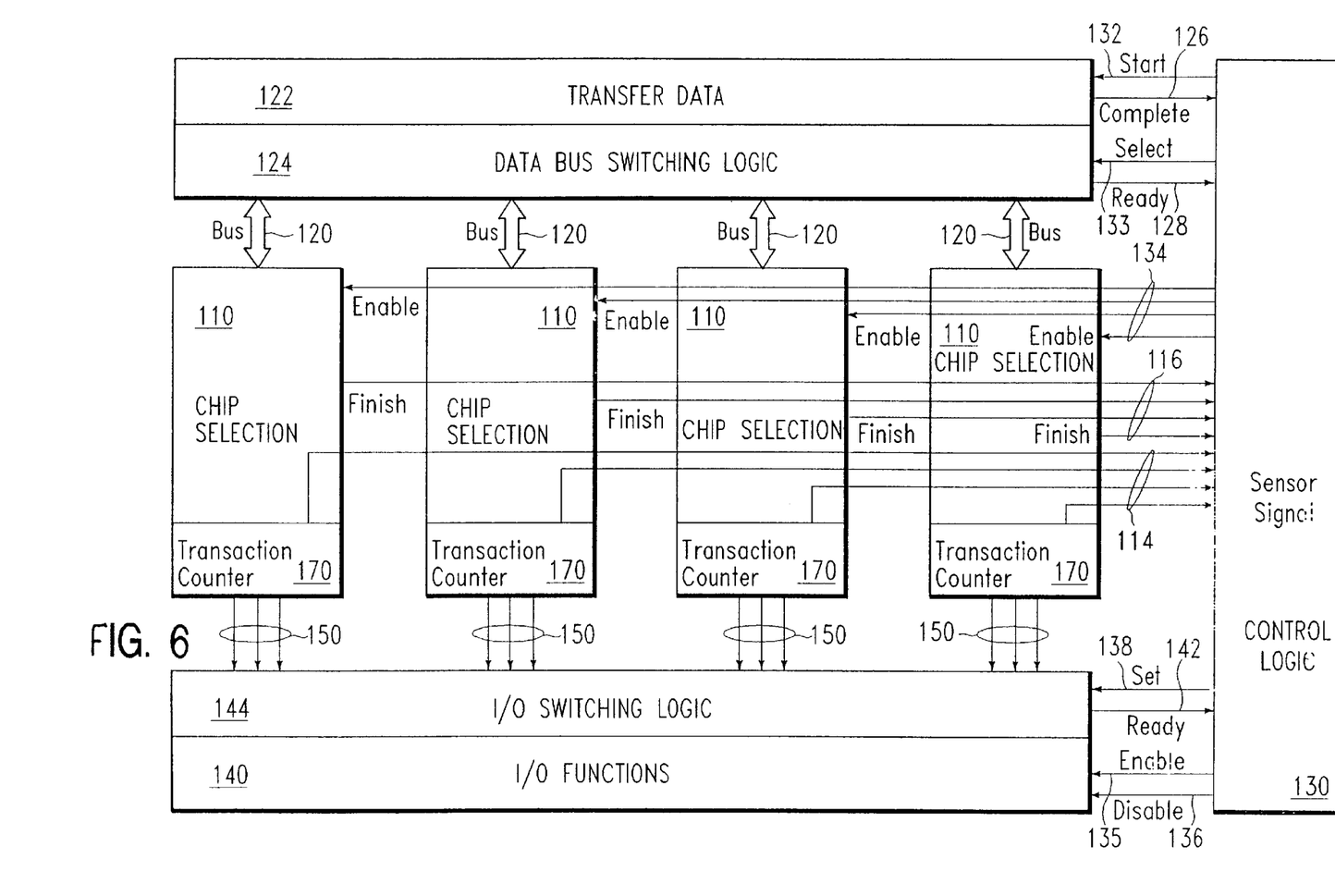
FIG. 6 is a block diagram of the invention using multiple chip sections and transaction

In another embodiment of the present invention transaction counting is used to initiate the switching between an active chip section to a standby chip section as illustrated in FIGS. 5 and 6. The schematic diagram shown in FIG. 5 is similar in operation as shown and described in connection with FIG. 1. It is noted that temperature sensors 12A and 12B have been replaced with transaction timers 70A and 70B which send switch signals 72A and 72B respectively to control logic 30 after a preset number of circuit operations have occurred or a preset number of operations in a preset unit of time have occurred in the active chip section. The number of chip sections, number or rate of operations, and nature of operations monitored is based on calculation and modeling of the chip circuit sections 10A and 10B under assumed design or experimental operating conditions. In this manner an active chip section which has executed a number of transactions and is operating at an elevated temperature will be turned off and replaced by a standby chip section.

Similarly the schematic diagram shown in FIG. 5 is similar in operation as described in connection with FIG. 2. However, the temperature sensors 112 have been replaced with transaction counters 170 which sends switch signals 172 to control logic 130 after a preset number of circuit operations have occurred in the active chip section or a preset number of operations in a preset unit of time have occurred. The number of chip sections, number or rate of operations, and nature of operations monitored is based on calculation and modeling of the chip circuit sections 110 under assumed design or experimental operating conditions. The switching between chip sections would thereby be handled based on optimum conditions to avoid any single chip section from becoming over heated.

Figure 7A:
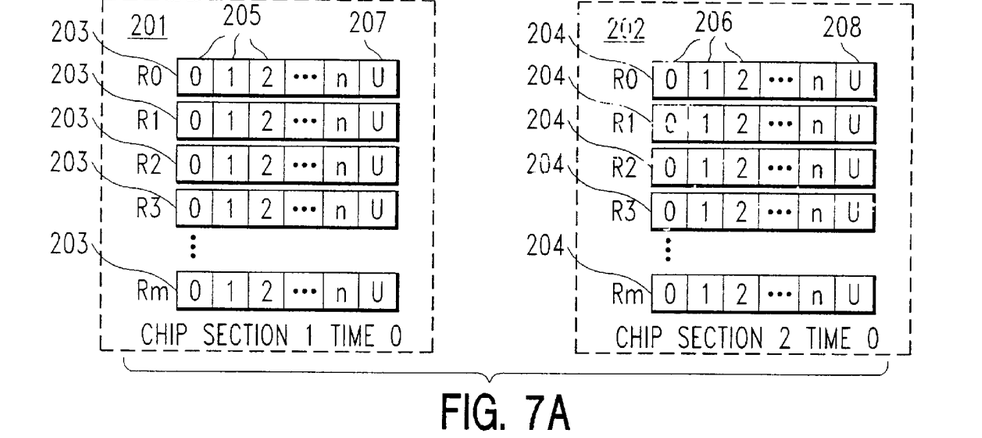
FIGS. 7a, 7b and 7c are representations of data registers in two chip sections illustrating register update.
Figure 7B:
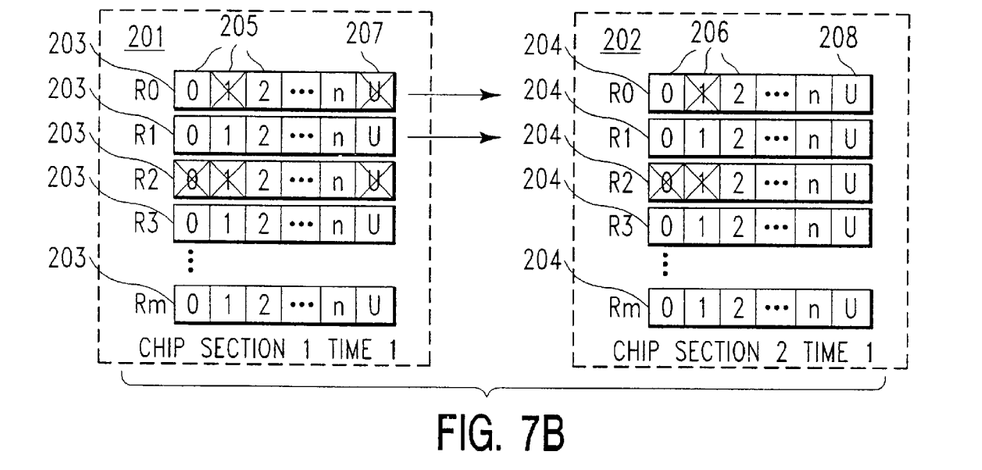
Figure 7C:
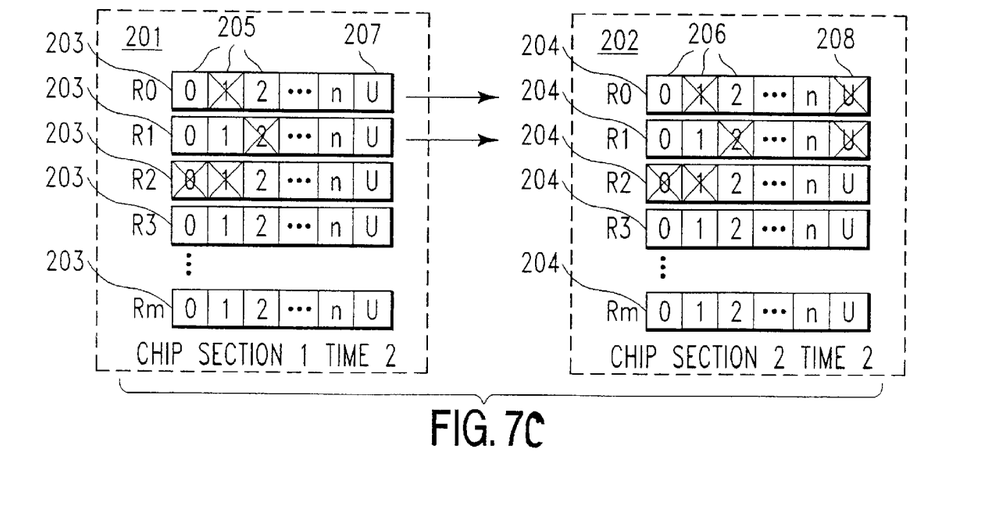

It would be possible to transfer all data from active to standby chip sections when the switching occurs. However, a more efficient technique to transfer data between the chip sections may be considered which is illustrated in FIGS. 7A through 7C. Referring to FIG. 7A, a first chip section 201 contains m number of data registers 203. Each data register 203 contains n number of data bits 205 and update "u" bit 207. Second chip section 202 contains m number of data registers 204. Each data register 204 contains n number of data bits 206 and update bit 208. The number, size and organization of the two sets of data registers are identical. In FIG. 7A both sets of registers are shown in an initial or reset state.

In FIG. 7B chip section 201 is active and chip section 202 is designated as the standby section. When the data bits in any register in any group is changed the update bit is marked. Upon transfer of data from one chip section to another chip section only the registers with update fields marked are transferred. After the transfer the update fields in the active section 201 are cleared. Chip section 202 may then become the active chip section and chip section 201 will become the standby section. After transfer both chip sections registers contain the same data.

FIG. 7C shows activity has occurred in active chip section 202. Upon transfer of data back to chip section 201 making it the active chip section, only registers with update fields marked are transferred. After the transfer the update fields from section 202 are then cleared and both chip sections registers contain the same data. The "X" in the data bits shown in FIGS. 7B and 7C indicate a data bit changed at any time since initialization or reset.

The method for transferring data described above is extendible to sets of three or more data registers in three or more chip sections. As a further enhancement it is contemplated that during the running state a controller may be included which would be able to scan through the update bits and on a first-in-first-out basis write out the contents of the marked data registers to the corresponding data registers in the next available chip section while clearing the marked update bits at the same time. This would be more efficient and greatly speed up switching time between active and standby chip sections.

Figure 8:
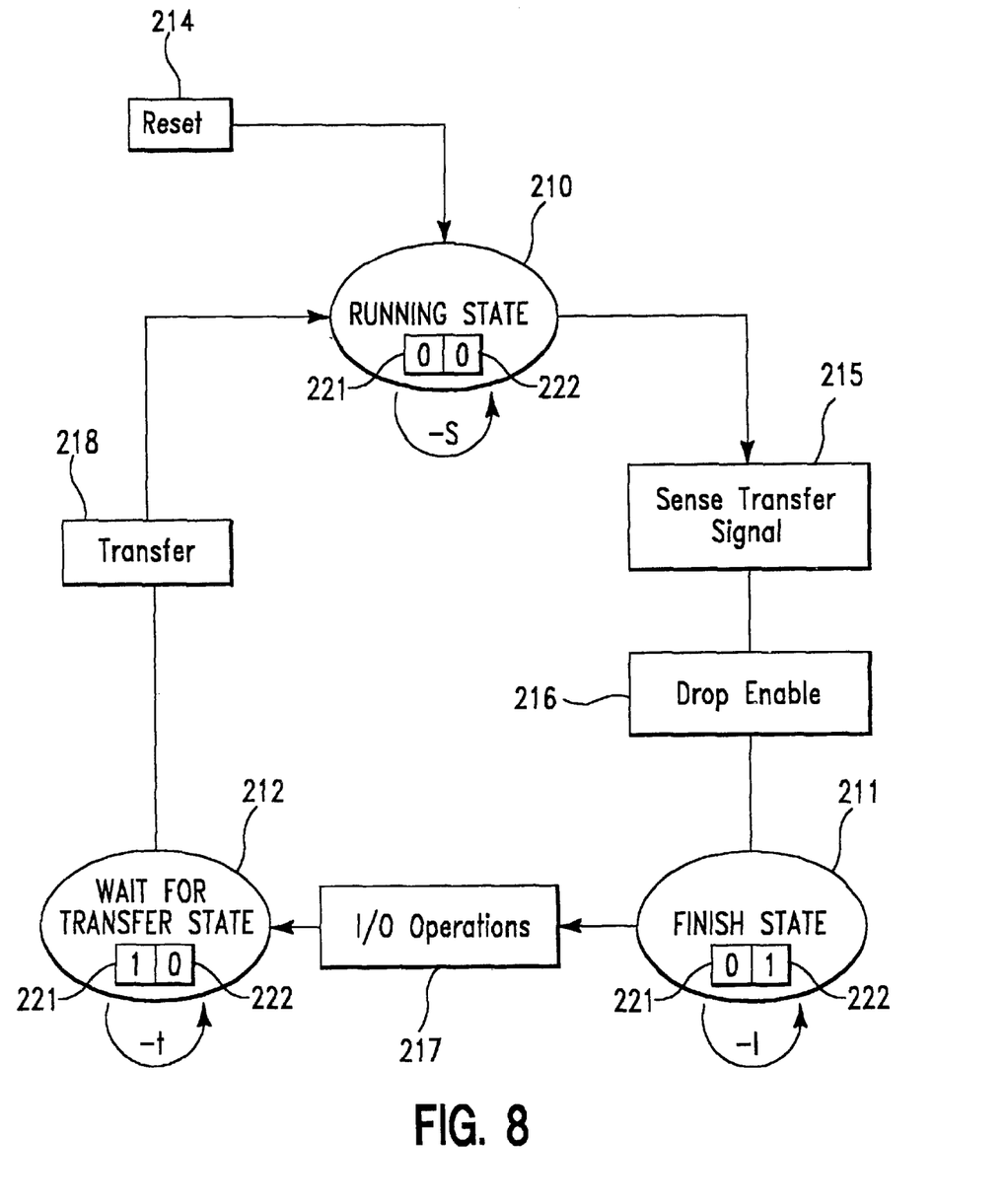
FIG. 8 is a state machine transition diagram of the present invention.

FIG. 8 illustrates a state machine transition diagram for each chip section according to the present invention. Running state operation 210, optional finish state operation 211 and transfer state operation 212 are shown. Since three states are possible two bits 221 and 222 are used to describe the active state. The active chip section starts in a running state 210, and upon receiving a sense transfer signal 215 which may be from temperature sensor, transaction counter, or timing device, the control logic circuits will create a drop enable signal 216. The active chip section will then complete its last operation, go into an optional finish state 211, which prevents any new functions, and wait for I/O operations 217 to complete. Upon completion of the I/O operations a finish signal is sent to the control logic circuits and the active chip section will go into a wait for transfer state 212 so that this chip section is now off-line. To activate a chip section, the data transfer operations 218 must be completed whereby a scan chain or I/O mapping is accomplished and the chip section may again enter running or active state 210.

Figure 9:
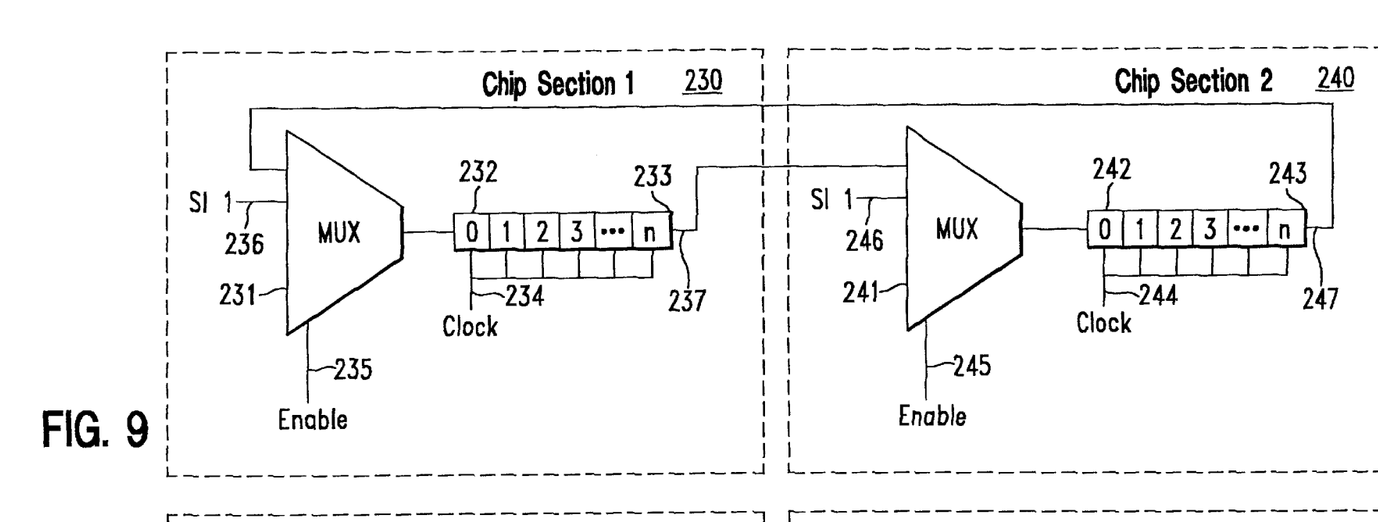
FIG. 9 is a schematic of a two chip section register update using scan chains.

The control of data transfers from the registers of one chip section to another may be accomplished using a scan chain as illustrated in FIG. 9 for two chip sections. MUX 231 on chip section 230 can receive scan in data 236 from within chip section 230 and scan out data 247 from chip section 240. MUX 241 on chip section 240 can receive scan in data 246 from within chip section 240 and scan out data 237 from chip section 230. Turning on the enable 235 allows data in register 243 to be read into register 233, other wise the data read into register 233 is from scan in data 236. Turning on the enable 245 allows data in register 233 to be read into register 243, other wise the data read into register 243 is from scan in data 246. Both enables cannot be on at the same time. The chip section being replaced is scanned out and the chip section being activated is scanned in. The rate of scanning of bits 232 and 242 in registers 233 and 243 respectively is controlled by clock signals 234, taking n clock signals.

Figure 10:
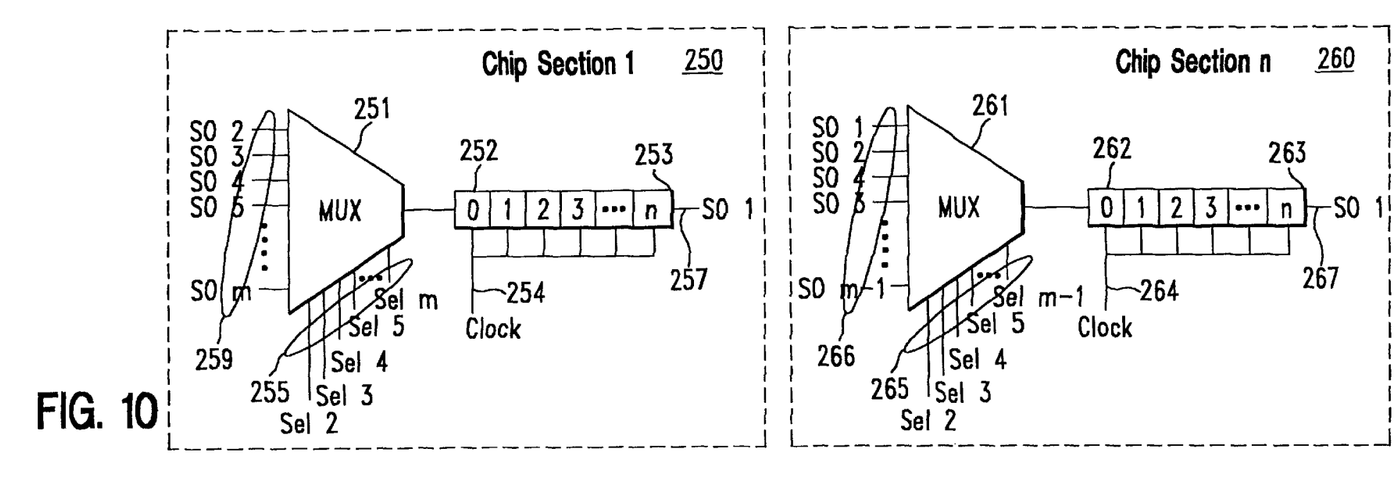
FIG. 10 a schematic of a multiple chip section register update using scan chains.

FIG. 10 illustrates a technique for scan chain method for multiple m chip sections. The first and last of m sections is shown. MUX 251 on the first chip section 250 can receive scan in data 256 from within chip section 250 and scan out data 259 from chip sections 2 thru m. MUX 261 on the m chip section 260 can receive scan in data 266 from within chip section 260 and scan out data 269 from chip sections 1 thru m−1. Select signal 255 on chip section 250, and select signals 265 on chip section 260 will be generated by the control logic to transfer data from and to the appropriate chip sections. The rate of scanning by clock signals 254, taking n clock signals.

Figure 11:
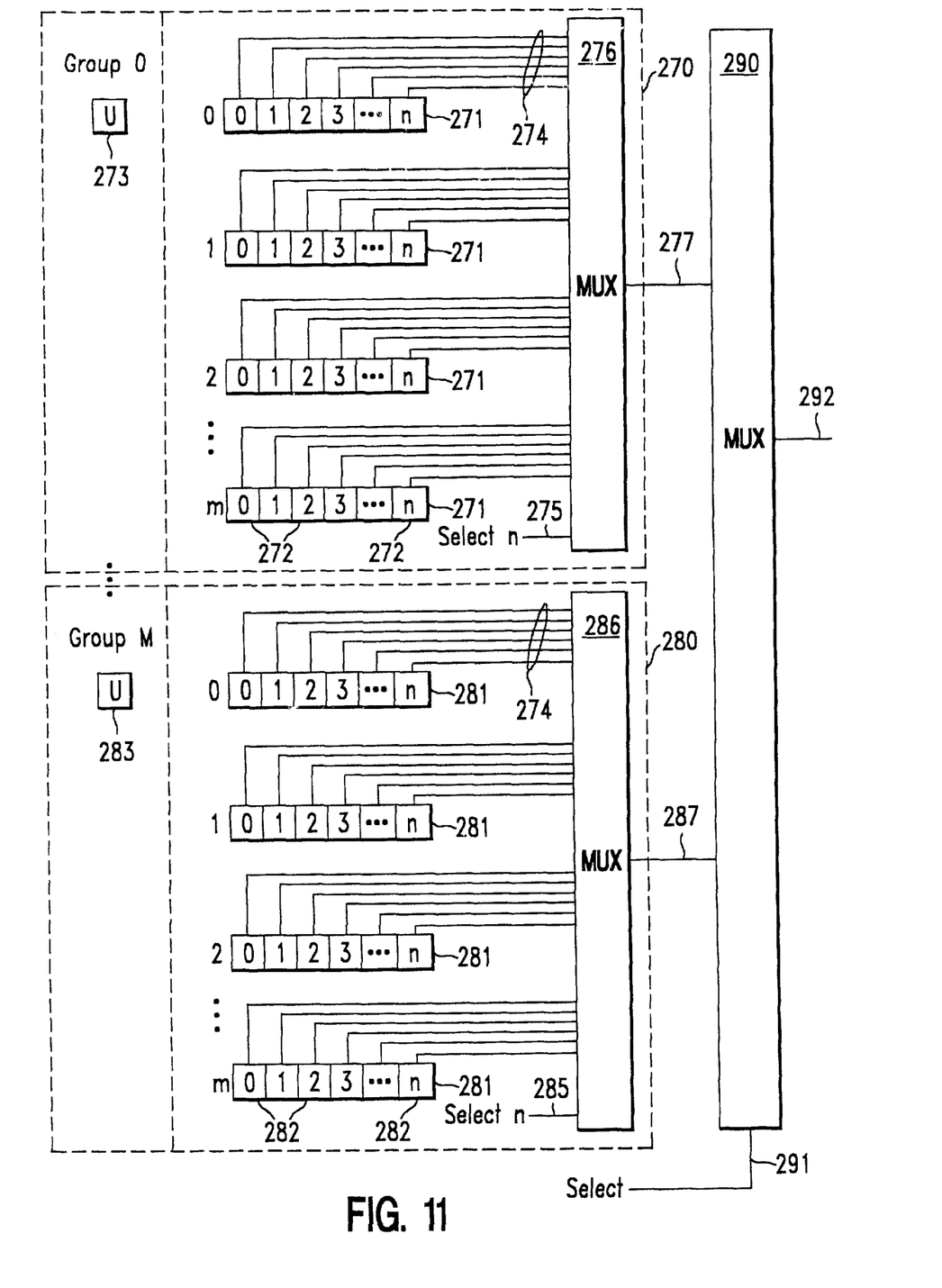
FIG. 11 is a schematic representation of chip section register update using I/O mapping and MUXing.

An I/O map with MUXing method for transferring data between chip sections is illustrated in FIG. 11. Data in each chip section is grouped into one or more data groups. The first group 270 and last group 280 is shown. Each data group has m data registers 271 and 281 respectively and each register has m data bits 272 and 282 respectively. The output from each bit is presented to MUX 276 and 286 respectively which can select the same bit address from all registers in the group. Since a large number of registers may exist and the MuXing means is required to select only one group at a time, a select n signal 275 and 285 respectively is provided. In this way, a transfer of data may be made from one chip section to another. The output from the MUX for each group 277 and 287 respectively is coupled to MUX 290. A group update bit 273 and 283 respectively is used to create the select 291 for MUX 290.

The control system sometimes referred to as the state machine as in connection with FIG. 8 is used to constantly monitor the activity of the active chip section and the standby section. The control system may then effectively use the I/O map to transfer the contents of the last active chip section to the next active chip section using the select signals and MUX operation described above.

Figure 12:
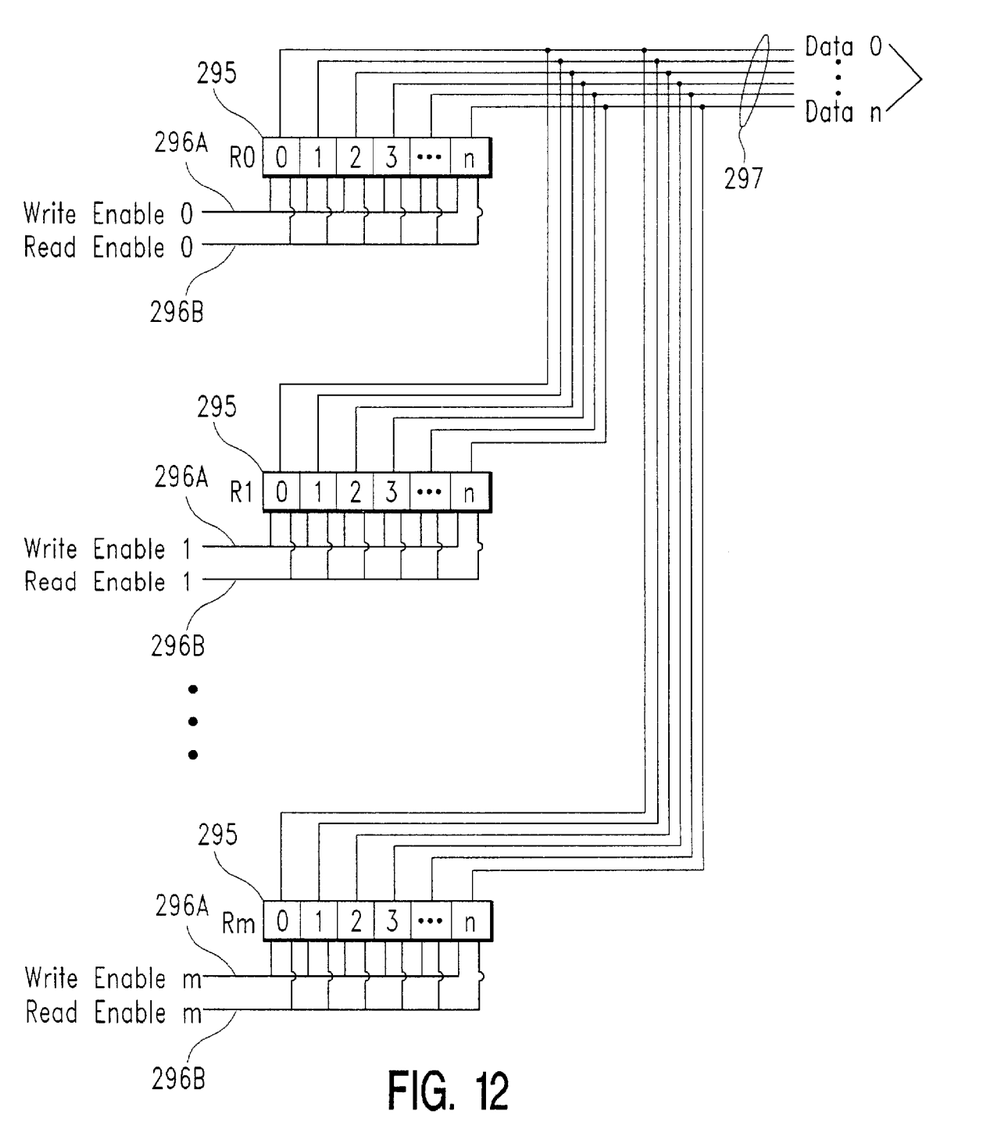
FIG. 12 is a schematic representation of chip section register update using I/O mapping with a tristate bus.

FIG. 12 illustrates a form of I/O mapping for data transfer between sections using a tristate driven bus. Multiple register groups 295 each having a bit addressable write enable 296A and a bit addressable read enable 296B, are wired in parallel to bidirectional data bus 297. The enables are selected by control logic 30.

In a tristate driven bus the control logic will control which register to be MUXed out. Since a large number of registers can exist, a tristate bus is required to select one group at a time. In this manner, a transfer of data can be accomplished from one section of the chip to the other. The control logic tracks the active chip section and standby chip section. The control logic uses I/O mapping to thereby transfer the contents of the last active to the next active machine with the write enables the output drive of the selected register which is tied together onto a tristate bus. In operation, the control system enables the read port of the next active section registers which then loads the data from the common tristate bus.

Figure 13:
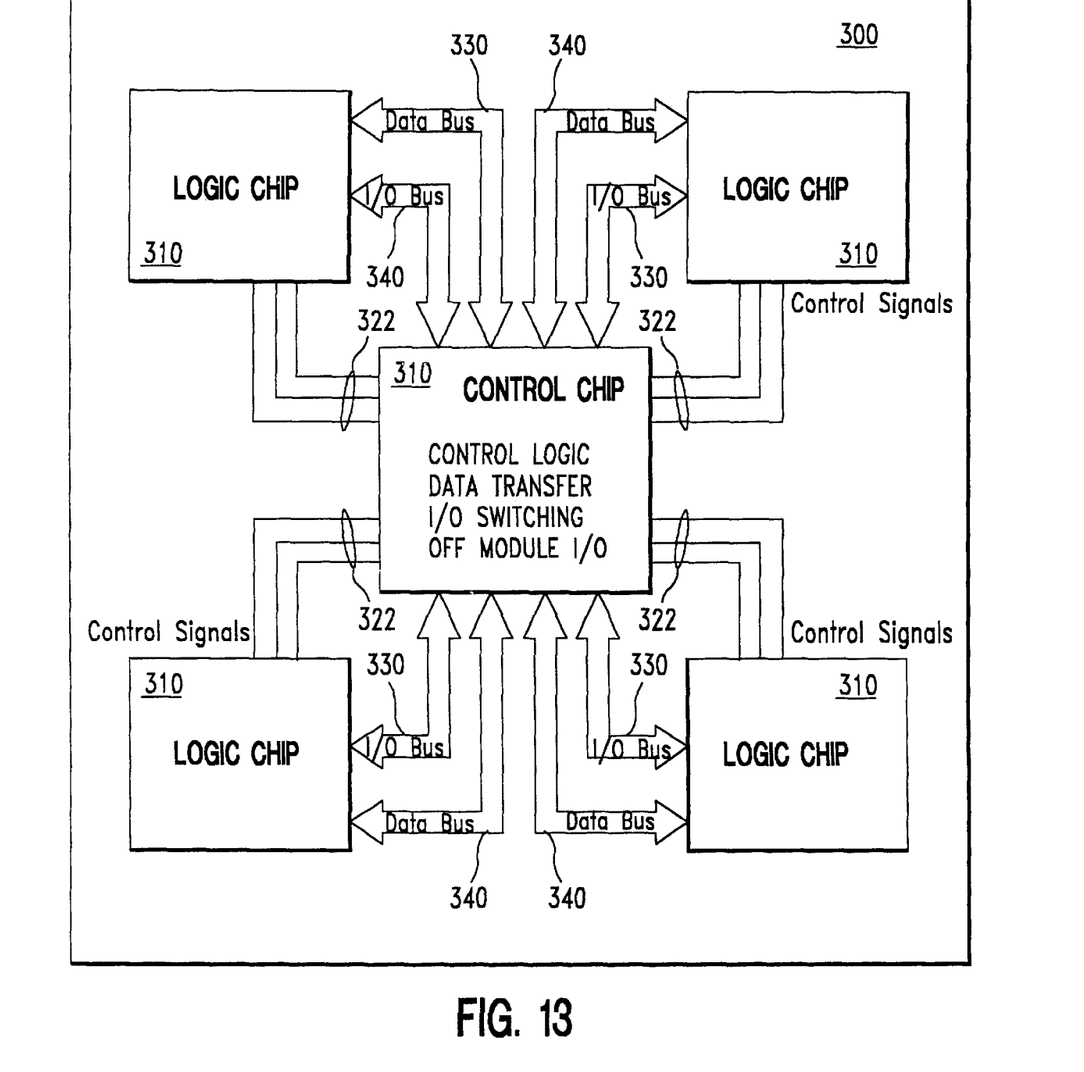
FIG. 13. is a diagram showing the present invention applied to multiple chips.

The present invention as so far been described with all chip sections on the same chip. It is also possible to apply the invention to multiple chips having identical functions. FIG. 13 illustrates a multi-chip module where each chip section is now a separate chip, and the data transfer circuits, control logic circuits, and I/O switching logic and function circuits are on a separate control chip. Multi-chip module 300 has a plurality of logic chips 310 which may be switched from active to standby mode and control chip 320 is disposed thereon. Control chip 320 provides control logic, data transfer between chips I/O switching between chips, and some off-chip I/O functions. Each logic chip 310 is coupled to control chip 320 by data bus 330, I/O bus 340 and control signal lines 322. The techniques for switching between active to standby sections of a chip described above may be applied to multiple chips. For example, each chip can be equipped with a temperature sensing circuit to determine when to switch between an active chip to a standby chip. Alternatively each chip could have a transaction counting circuit to determine when to switch between an active chip to a standby chip. Alternatively, a timer circuit on the control chip could be used to determine when to switch between an active chip to a standby chip.

The description of the embodiments of the present invention is given above for the understanding of the present invention. It will be understood that the invention is not to the particular embodiments described herein, but is capable of various modifications, rearrangements and substitutions will now become apparent to those skilled in the art without departing from the scope of the invention. Therefore it is intended that the following claims cover all such modifications and changes as fall within the true spirit and scope of the invention.

What is claimed is:

1. A semiconductor device comprising:
   a plurality of chip sections each capable of performing the same logic, data register and I/O operations, at least one of the chip sections being in an active mode and at least one of the chip sections being in a standby mode;
   first means for generating a control signal when it is determined that the active chip section has been in the active mode for a length of time exceeding a first preset limit; and
   control means for replacing one of the chip sections in the active mode with one of the chip sections in the standby mode upon receiving the control signal.

2. The semiconductor device of claim 1 wherein the control means includes a switching means for switching I/O operations from the chip section in the active mode to the chip section in standby mode.

3. The semiconductor device of claim 2 wherein the control means includes a data transfer means for transferring data register values from the chip section in the active mode to the chip section in the standby mode.

4. The semiconductor device of claim 3 wherein the control means includes means for placing the active chip section in the standby mode and the standby chip section into the active mode.

5. The semiconductor device of claim 4 wherein the data transfer means comprises a scan chain circuit.

6. The semiconductor device of claim 4 wherein the data transfer means comprises a memory map circuit.

7. The semiconductor device of claim 1 wherein the chip section in standby mode is selected to become the active chip section because it has been in the standby mode for a length of time exceeding a second preset limit.

8. The semiconductor device of claim 1 wherein the first means includes means for determining the number of operations in a preselected time period the chip section has been in the active mode and generates the control signal when the number of operations in a preselected time period exceeds a preset limit.

9. The semiconductor device of claim 1 wherein the first means includes a temperature sensing circuit in each chip section which generates the control signal upon detection of a temperature greater than a preset limit within the chip section that is in the active mode.

10. A semiconductor device comprising:
    a plurality of chips each capable of performing the same operations, at least one of the chips being in an active mode and the remainder of the chips being in a standby mode;
    a control chip having:
       means for routing data and I/O signals from the chips in the active mode to one of the chips in the standby mode;
       means for determining the length of time the chip in the active mode has been active and the length of time the chip in the standby mode has been in the standby mode;
       means for replacing the chip in the active mode when the length of time in the active mode exceeds a first preset limit with one of the chips in standby mode which has been in standby mode for a length of time exceeding a second preset limit; and
       means for placing the active chip in standby mode and the selected standby chip into the active mode.

11. The semiconductor device of claim 10 wherein the control chip includes a scan chain circuit for transferring machine state data from the chip in active mode to the selected chip in standby mode.

12. The semiconductor device of claim 10 wherein the control chip includes a memory map circuit for transferring machine state data from the chip in active mode to the chip section in standby mode.

13. A semiconductor device comprising:
    a plurality of chips each capable of performing the same operations, at least one of the chips being in active mode and the remainder of the chips being in a standby mode;
    a control chip having:
       means for routing data and I/O signals from the chips in the active mode to one of the chips in the standby mode;
       means for determining the number of operations in a preselected time period the chip is in the active mode;
       means for replacing the chip in the active mode when the number of operations in a preselected time period exceeds a preset limit with one of the chips in the standby mode; and
       means for placing the active chip in standby mode and the selected standby chip into the active mode.

14. The semiconductor device of claim 13 wherein the control chip includes a scan chain circuit for transferring machine state data from the chip in active mode to the chip in standby mode.

15. The semiconductor device of claim 13 wherein the control chip includes a memory map circuit for transferring machine state data from the chip in active mode to the chip section in standby mode.

16. A method of preventing thermal failure in a semiconductor device having a plurality of sections each capable of performing the same logic, register and I/O operations on data and having two states a first running state wherein all operations of the section are enabled and a second wait for transfer state wherein a portion of the operations of the device section are disabled, and at least one of the device sections is in the running state and the remainder of the device sections is in the second wait for transfer state, comprising the steps of:

detecting a pre thermal failure event in the device section in the first state;

selecting one of the device sections in the second wait for transfer state;

transferring data from the device section in the first running state to the selected device section after the event is detected; and placing the device section in the first running state into the second wait for transfer state and the selected device section into the first running state.

17. The method of claim 16 wherein the step of transferring is performed by means of a scan chain circuit coupled to registers in all the device sections.

18. The method of claim 16 wherein the step of transferring is performed by means of an 1/O map circuit coupled to data registers in all the device sections.

19. The method of claim 17 wherein the device sections further have a third finish state and further comprising the steps of:

placing the device section in the first running state into the third finish state before detection of the pre thermal event failure event.

20. The method of claim 16 wherein the detecting step includes a step of generating a signal when the device section in the first running state reaches a temperature above a preset limit.

21. The method of claim 20 wherein the step of selecting includes a step of:

determining which of the device sections in the second transfer state are at a temperature below a second preset limit.

22. The method of claim 16 wherein the detecting step includes a step of:

Generating a signal when the device section in the first running state has been in the running,state above a preset length of time.

23. The method of claim 22 wherein the step of selecting includes a step of:

determining if the length of time that each device section in the second wait for transfer state has been in that state in order that the device waiting the longest may be selected to transfer to the first running state.

24. The method of claim 22 wherein the step of selecting includes a step of:

determining if the length of time any device sections in the second wait for transfer state have been in the second wait for transfer state exceeding a second preset limit.

25. The method of claim 16 wherein the detecting step includes a step of:

generating a signal when the device section in the first running state has been performing a certain number of logic operations in a pre-selected period of time.

* * * * *